United States Patent
Liang et al.

(10) Patent No.: US 9,998,352 B2
(45) Date of Patent: Jun. 12, 2018

(54) METHOD AND SYSTEM FOR SENDING FLOW TABLE IN SDN, OF CONTROLLER, AND OF SWITCH

(71) Applicant: ZTE Corporation, Shenzhen (CN)

(72) Inventors: Qiandeng Liang, Shenzhen (CN); Jianjie You, Shenzhen (CN); Wei Wan, Shenzhen (CN); Fangwei Hu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 177 days.

(21) Appl. No.: 14/914,070

(22) PCT Filed: Jun. 20, 2014

(86) PCT No.: PCT/CN2014/080420
§ 371 (c)(1),
(2) Date: Feb. 24, 2016

(87) PCT Pub. No.: WO2015/027739
PCT Pub. Date: Mar. 5, 2015

(65) Prior Publication Data
US 2016/0218957 A1    Jul. 28, 2016

(30) Foreign Application Priority Data

Aug. 27, 2013 (CN) .......................... 2013 1 0379469

(51) Int. Cl.
*H04L 12/757* (2013.01)
*H04L 12/755* (2013.01)
(Continued)

(52) U.S. Cl.
CPC ............ *H04L 45/021* (2013.01); *H04L 45/02* (2013.01); *H04L 45/028* (2013.01); *H04L 45/38* (2013.01); *H04L 45/64* (2013.01); *H04L 45/742* (2013.01)

(58) Field of Classification Search
CPC ..... H04L 45/021; H04L 45/38; H04L 45/028; H04L 45/64; H04L 45/742; H04L 45/02
See application file for complete search history.

(56) References Cited

U.S. PATENT DOCUMENTS 8,416,796 B2    4/2013    Forster
8,762,501 B2 *  6/2014    Kempf ................ H04L 12/4633
                                                                709/220

(Continued)

FOREIGN PATENT DOCUMENTS

CN    102594664 A    7/2012
CN    102843298 A    12/2012
(Continued)

OTHER PUBLICATIONS

International Search Report in international application No. PCT/CN2014/080420, dated Sep. 23, 2014.
(Continued)

*Primary Examiner* — Phuc Tran
(74) *Attorney, Agent, or Firm* — Oppedahl Patent Law Firm LLC

(57) ABSTRACT

A method and system for sending a flow table in a Software Defined Network (SDN) are described in the present disclosure, an OpenFlow (OF) controller, and an OF switch. The method includes that an OF switch receives a flow table entry modification message sent from an OF controller, wherein the message includes a table number, a flow table entry, and a cache label; and the OF switch stores, in a control module of the OF switch, the table number and the
(Continued)

flow table entry in the flow table entry modification message according to an indication of the cache label.

15 Claims, 5 Drawing Sheets

(51) Int. Cl.
| | |
|---|---|
| *H04L 12/715* | (2013.01) |
| *H04L 12/751* | (2013.01) |
| *H04L 12/747* | (2013.01) |
| *H04L 12/759* | (2013.01) |
| *H04L 12/721* | (2013.01) |

(56) References Cited

U.S. PATENT DOCUMENTS

| | | | |
|---|---|---|---|
| 8,873,398 B2* | 10/2014 | Kempf | H04W 24/02 370/216 |
| 9,602,421 B2* | 3/2017 | Koponen | G06F 9/45558 |
| 9,722,917 B2* | 8/2017 | Giorgetti | H04L 45/64 |
| 2011/0286326 A1* | 11/2011 | Awano | H04L 45/34 370/225 |
| 2011/0317701 A1* | 12/2011 | Yamato | H04L 45/04 370/392 |
| 2013/0246655 A1* | 9/2013 | Itoh | H04L 12/56 709/238 |

FOREIGN PATENT DOCUMENTS

| | | |
|---|---|---|
| CN | 102904975 A | 1/2013 |
| CN | 102946325 A | 2/2013 |
| CN | 102946365 A | 2/2013 |

OTHER PUBLICATIONS

English Translation of the Written Opinion of the International Search Authority in international application No. PCT/CN2014/080420, dated Sep. 23, 2014.

* cited by examiner (1): A matched flow table entry having the highest priority is found.
(2): Application instruction: a packet is modified or a match field is updated; an action field is updated; and metadata is updated.
(3): Matched data and action set are sent to the next flow table.

METHOD AND SYSTEM FOR SENDING FLOW TABLE IN SDN, OF CONTROLLER, AND OF SWITCH

TECHNICAL FIELD

The present disclosure relates to the field of network communication of Software Defined Network (SDN) architecture, and more particularly, to a method for sending a flow table in an SDN.

BACKGROUND

Higher and higher network performance are required because of more and more drawbacks exposed in existing networks, and it is thus necessary to add many complex functions to router architecture, such as Open Shortest Path First (OSPF), Border Gateway Protocol (BGP), multicast, Differentiated services, traffic engineering, Network Address Translation (NAT), firewalls, Multi-Protocol Label Switching (MPLS), and so on, which increasingly bloats switching devices including a router and so on, and makes it less possible to improve the performance of the switching devices.

Unlike the dilemma of the network field, however, the computer field is making rapid development, and it can be easily found by carefully reviewing the development in the computer field that the key is a simple and available hardware bottom layer (an x86 instruction set) found in the computer field. Due to such a public hardware bottom layer, rapid progress has been made by both Applications (APP) and operating systems in terms of software. At present, it is believed by many advocators of redesign of computer network architecture that a network may replicate the success of the computer field to overcome all problems encountered by the existing networks. Guided by such an idea, a future network be certainly like this: a data channel (a switch or a router) of a bottom layer is "mute, simple and the smallest", an open and public Application Programming Interface (API) related to a flow table is defined, while a controller is applied to controlling the whole network, and future researchers may freely invoke the API of the bottom layer for programming on the controller, thus implementing network innovation.

An SDN emerges based on the idea above, and the core technology of the SDN is an OpenFlow (OF) protocol. FIG. 1 shows OF protocol application architecture. A control plane (including an OF controller) and a data plane (including an OF capable switch) of a network device are separated so as to control network traffic flexibly and provide a good platform for innovation of core networks and application.

The OF protocol is used for describing a standard of information applied to interaction between a controller and a switch and an interface standard of the controller and the switch, and the core of the protocol is a set applied to an OF protocol information structure.

An OF flow table (as shown in FIG. 3), or a pipeline formed by cascading a plurality of arranged flow tables is used for configuring a forwarding path (as shown in FIG. 2) of the switch. A flow table entry consists of several fields including match fields, counters, instructions and so on as follows.

| Match Fields | Priority | Counters | Instructions | Timeouts | Cookie |
|---|---|---|---|---|---| where the match fields are input keywords matched with a packet and used for matching a flow table entry; the counters are used for manage various used statistic information; the instructions are operation instructions for the packet, including discarding, and forwarding of the packet to a designated port, setting of a value of a header field of the packet, addition of an encapsulation label and so on; the priority refers to the matching priority of the flow table entry; the timeouts refer to the aging time of the flow table entry; and the cookie is an opaque data value selected by the controller. An action set is associated with each packet, transmitted among a plurality of flow tables of a pipeline, and modified by instructions of the flow tables until processing of the pipeline is ended to form a final action set.

There is a large number of routing entries, generally hundreds of thousands or even millions of routing entries in a telecommunication network, and a controller or an APP learns, through a dynamic routing protocol, that if all flow table entries of the routing information are sent to OF switches after routing of the whole network, extremely large flow table capacity will be required on the OF switches while only a few routing table entries may have traffic within a period of time as a matter of fact. If an OF controller can send a routing flow table entry as required, and enable an OF switch to use idleness aging of a relatively short period of time, a routing information set on the controller can be reduced and mapped on the OF switch effectively within a limited period of time, thus relieving the pressure on a routing flow table entry capacity index of the OF switch and implementing a routing flow table entry capacity exceeding the index of the OF switch. However, in the related art a solution on the technical problem above is not provided, and the inventors of the present application found in practice that a major method to achieve the purpose is to transmit a first traffic packet of an unmatched routing flow table entry so as to trigger the controller to send routing information required by the OF switch. However, the controller sends the routing table entry with a relatively long time delay after the controller to senses the requirement of the OF switch, which will result in upward transmission of a large number of packets and consume valuable bandwidths between the OF switch and the controller. Thus, it is expected that the method may be further optimized. At present, many OF switches are implemented by distributed Central Processing Unit (CPU) architecture. A control plane and a forwarding plane are separated. The control plane is implemented by a separate CPU and has richer memory resources than the forwarding plane. The present disclosure is provided based on an OF switch of such implementation architecture.

SUMMARY

An embodiment of the present disclosure provides a method for sending a flow table in an SDN so as to solve the existing technical problem.

An embodiment of the present disclosure provides a method for sending a flow table in an SDN. The method includes that:

an OF switch receives a flow table entry modification message sent from an OF controller, wherein the message includes a table number, a flow table entry and a cache label; and the OF switch stores, in a control module of the OF switch according to an indication of the cache label, the table number and the flow table entry in the flow table entry modification message.

In the solution above, the flow table entry modification message may further include a first idleness aging period.

In the solution above, before the OF controller sends the flow table entry modification message, the method may further include that:

the OF switch negotiates a flow table cache capability with the OF controller, and the OF switch notifies the OF controller of whether the OF switch supports a flow table cache function.

In the solution above, that the OF switch negotiates the flow table cache capability with the OF controller may include that:

the OF switch receives a multipart table features request message sent from the OF controller, wherein the message includes the table number;

the OF switch returns a multipart table features reply message to the OF controller, wherein a flow table feature capability attribute field of the multipart table features reply message includes a flow table entry cache capability label for indicating whether a flow table entry cache function of a flow table corresponding to the table number is supported.

In the solution above, the flow table feature capability attribute field may further include a default second idleness aging period of a flow table supporting a cache function.

In the solution above, the method may further include that:

a forwarding module of the OF switch queries, when receiving a packet, whether a matched flow table entry exists in a flow table of the forwarding module;

if so, the packet is forwarded according to the queried and matched flow table entry;

otherwise, the forwarding module sends the packet, a table number, and an upward transmission reason to a control module of the OF switch; the control module queries, according to the received table number and a flow table entry cache label stored by the control module, a flow table entry cached in a corresponding local flow table; if the corresponding flow table entry is acquired through the query, adds the flow table entry acquired through the query to the corresponding flow table of the forwarding module, otherwise, fills the packet, the table number and the upward transmission reason received by the control module in a Packet-in message and sends the same to the OF controller.

In the solution above, the method may further include that idleness aging is performed, according to the second idleness aging period, on a flow table entry that can be cached according to an indication of a cache label in the forwarding module of the OF switch, and when the OF controller sends a corresponding flow table entry, idleness aging is performed according to the first idleness aging period set on a corresponding flow table entry cached by the control module, wherein the duration of the first idleness aging period is longer than that of the second idleness aging period.

An embodiment of the present disclosure further provides a method for sending a flow table in an SDN. The method includes that:

when deciding, according to a local strategy, to Seta cache label for a sent flow table entry, an OF controller sends a flow table entry modification message to an OF switch, wherein the message includes a table number, a flow table entry, and a cache label and the cache label is used for instructing to cache the flow table entry in a control module of the OF switch locally.

In the solution above, the flow table entry modification message may further include a first idleness aging period.

In the solution above, before the OF controller sends the flow table entry modification message, the method may further include that:

the OF controller negotiates a flow table cache capability with the OF switch, and the OF controller acquires whether the OF switch supports a cache function of a flow table.

In the solution above, that the OF controller negotiates the flow table cache capability with the OF switch may include that:

the OF controller sends a multipart table features request message to the OF switch, wherein the message includes the table number;

the OF controller receives a multipart table features reply message returned by the OF switch, wherein a flow table feature capability attribute field of the multipart table features reply message includes a flow table entry cache capability label for instructing whether a flow table entry cache function of a flow table corresponding to the table number is supported.

In the solution above, the flow table feature capability attribute field may further include a default second idleness aging period of a flow table supporting a cache function.

In the solution above, the method may further include that:

when the OF controller receives a Packet-in message including a packet, a table number and an upward transmission reason from the OF switch, the OF controller parses the Packet-in message, and sends the packet in the Packet-in message to a local protocol stack or an App of the OF controller for processing.

An embodiment of the present disclosure further provides an OF switch, including a control module, configured to receive a flow table entry modification message sent from an OF controller, wherein the message includes a table number, a flow table entry and a cache label; and store, in the control module of the OF switch locally according to an indication of the cache label, the table number and the flow table entry in the flow table entry modification message.

In the solution above, the flow table entry modification message may further include a first idleness aging period.

In the solution above, the control module may be configured to negotiate a flow table cache capability with the OF controller before receiving the flow table entry modification message and notify the OF controller of whether the OF switch supports a flow table cache function.

In the solution above, the control module may be configured to receive a multipart table features request message sent from the OF controller, wherein the message includes the table number; and return a multipart table features reply message to the OF controller, wherein a flow table feature capability attribute field of the multipart table features reply message includes a flow table entry cache capability label for indicating whether a flow table entry cache function of a flow table corresponding to the table number is supported.

In the solution above, the flow table feature capability attribute field may further include a default second idleness aging period of a flow table supporting a cache function.

In the solution above, the OF switch may further include a forwarding module configured to query, when receiving a packet, whether a matched flow table entry exists in a flow table of the forwarding module;

if so, forward the packet according to the queried and matched flow table entry;

otherwise, send the packet, a table number, and an upward transmission reason to the control module of the OF switch; accordingly, the control module is configured to query, according to the received table number and a flow table entry cache label stored by the control module, a flow table entry cached in a corresponding local flow table; if the corresponding flow table entry is acquired through the query, add the flow table entry acquired through the query to the corresponding flow table of the forwarding module, otherwise, fill the packet, the table number and the upward transmission reason received by the control module in a Packet-in message and send the same to the OF controller.

In the solution above, the control module may be configured to perform, according to the second idleness aging period, idleness aging on a flow table entry that can be cached according to an indication of a cache label in the forwarding module of the OF switch, and perform, according to the first idleness aging period set when the OF controller sends a corresponding flow table entry, idleness aging on a corresponding flow table entry cached by the control module, wherein the duration of the first idleness aging period is longer than that of the second idleness aging period.

An embodiment of the present disclosure further provides an OF controller, including: a sending module configured to send, when deciding, according to a local strategy, to set a cache label for a sent flow table entry, a flow table entry modification message to an OF switch, wherein the message includes a table number, a flow table entry, and a cache label and the cache label is used for instructing to cache the flow table entry in a control module of the OF switch locally.

In the solution above, the flow table entry modification message may further include a first idleness aging period.

In the solution above, the OF controller may further include a negotiating module configured to, before the sending module sends the flow table entry modification message, negotiate a flow table cache capability with the OF switch, and acquire whether the OF switch supports a cache function of a flow table.

In the solution above, the negotiating module may be configured to send a multipart table features request message to the OF switch, wherein the message includes the table number; receive a multipart table features reply message returned by the OF switch, wherein a flow table feature capability attribute field of the multipart table features reply message includes a flow table entry cache capability label for instructing whether a flow table entry cache function of a flow table corresponding to the table number is supported.

In the solution above, the flow table feature capability attribute field may further include a default second idleness aging period of a flow table supporting a cache function.

In the solution above, the OF controller may further include: a receiving and processing module configured to, when receiving a Packet-in message including a packet, a table number and an upward transmission reason from the OF switch, parse the Packet-in message, and send the packet in the Packet-in message to a local protocol stack or an APP of the control module for processing.

An embodiment of the present disclosure further provides a system for sending a flow table in an SDN, including the OF switch the OF controller;

the OF controller is configured to, when deciding, according to a local strategy, to set a cache label for a sent flow table entry, send a flow table entry modification message to the OF switch, wherein the message includes a table number, a flow table entry, and a cache label; and the OF switch is configured to receive the flow table entry modification message, and store in a control module of the OF switch locally according to an indication of the cache label, the table number and the flow table entry in the flow table entry modification message.

An embodiment of the present disclosure further provides a computer readable storage medium. The storage medium includes a group of computer executable instructions for executing the method for sending the flow table in the SDN.

An embodiment of the present disclosure further provides a computer readable storage medium. The storage medium includes a group of computer executable instructions for executing the method for sending the flow table in the SDN.

According to an embodiment of the present disclosure, an OF controller sends learned or statically configured routing to a control plane of an OF switch by batch according to a certain strategy for caching, and the routing is then transmitted upwards by traffic of an unmatched routing flow table entry of a forwarding plane of the OF switch, so as to trigger searching of a corresponding flow table entry in a cached routing flow table of the control plane of the OF switch, after the corresponding flow table entry is found, the routing flow table of the forwarding plane is sent directly, and a short term idleness aging timer is started as required while different Packet-in packets are constructed and transmitted upwards to the controller; and if the corresponding flow table entry is not found, a Packet-in packet is constructed and transmitted upwards to the controller for processing. By means of the embodiment of the present disclosure, the OF controller can send a flow table entry as required and enable the OF switch to use idleness aging of a relatively short period of time, thus a routing information set on the controller can be reduced and mapped on the OF switch effectively within a limited period of time, the pressure on a routing flow table entry capacity index of the OF switch is relieved and a routing flow table entry capacity exceeding the index of the OF switch is implemented. The embodiment of the present disclosure can further reduce a time delay for the controller to sense a requirement of the OF switch and send a routing table entry, thus reducing bandwidth consumption between the OF switch and the controller.

DETAILED DESCRIPTION

The technical solutions of the present disclosure will be further expounded hereinafter in combination with the accompanying drawings and specific embodiments.

Figure 1:
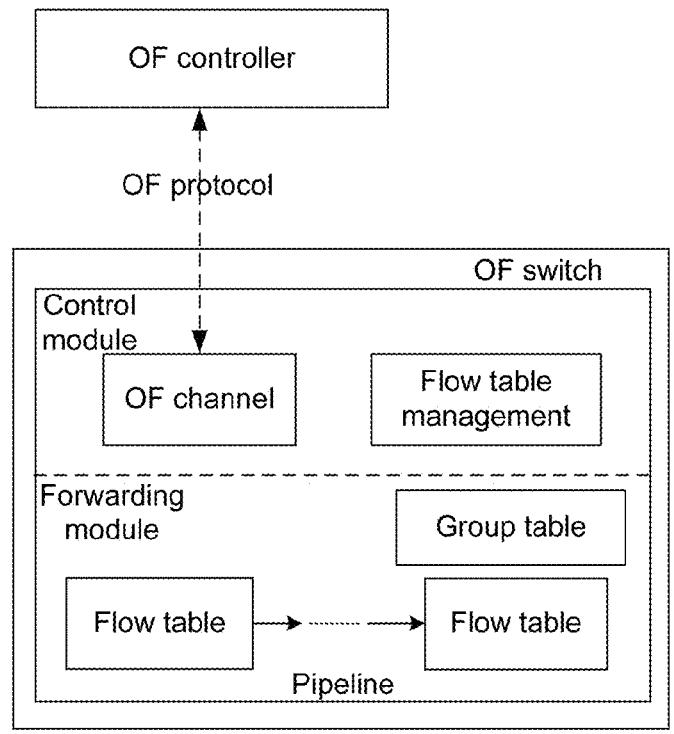
FIG. 1 is a diagram of OF protocol application architecture in the related art.
Figure 2:
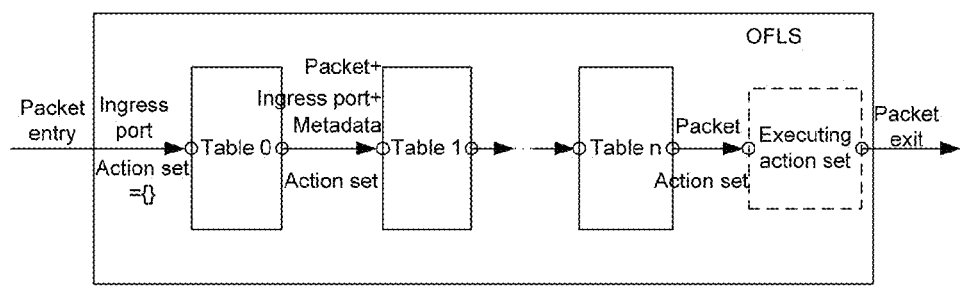
FIG. 2 is a schematic diagram of a packet stream through an OF processing pipeline according to the related art.
Figure 3:
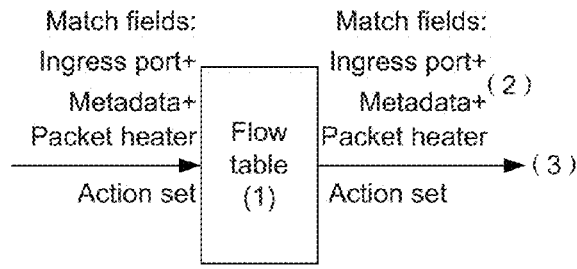
FIG. 3 is a schematic diagram of packet processing based on each table in the related art.
Figure 4:
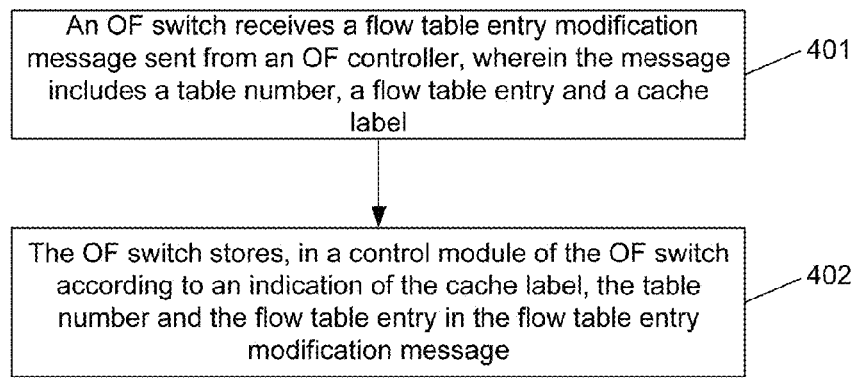
FIG. 4 is a flow chart of a method for sending a flow table in an SDN according to an embodiment of the present disclosure.

FIG. 4 shows a method for sending a flow table in an SDN at an OF switch side according to an embodiment of the present disclosure. The method mainly includes:

Step 401: An OF switch receives a flow table entry modification message sent from an OF controller, wherein the message includes a table number, a flow table entry and a cache label.

Preferably, the flow table entry modification message further includes a first idleness aging period. The first idleness aging period is an aging period of a flow table entry in a control module, which is set by the OF controller for the OF switch.

Step 402: The OF switch stores, in a control module of the OF switch according to an indication of the cache label, the table number and the flow table entry in the flow table entry modification message.

Figure 5:
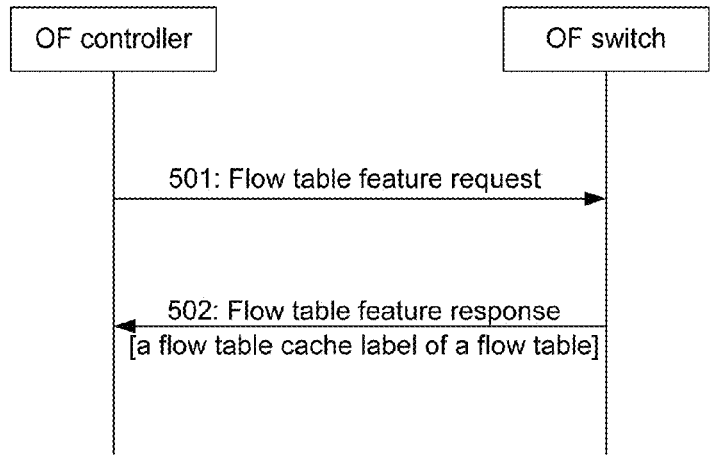
FIG. 5 is a flow chart of negotiation of a flow table cache capability according to an embodiment of the present disclosure.

As a preferred embodiment, before the OF controller sends the flow table entry modification message, the method further includes that: the OF switch negotiates a flow table cache capability with the OF controller, and the OF switch notifies the OF controller of whether the OF switch supports a flow table cache function, wherein the OF switch negotiating the flow table cache capability with the OF controller is as shown in FIG. 5, which includes:

Step 501: The OF switch receives a multipart table features request message sent from the OF controller, wherein the message includes the table number.

Step 502: The OF switch returns a multipart table features reply message to the OF controller, wherein a flow table feature capability attribute field of the multipart table features reply message includes a flow table entry cache capability label for indicating whether a flow table entry cache function of a flow table corresponding to the table number is supported.

Preferably, the flow table feature capability attribute field further includes a default second idleness aging period of a flow table supporting a cache function.

Preferably, a new OFPTC_CACHE parameter may be added to the flow table feature capability attribute field. The OFPTC_CACHE parameter is used as the flow table entry cache capability label and may be further used for setting the second idleness aging period.

As a preferred embodiment, the method further includes that:

a forwarding module of the OF switch queries, when receiving a packet, whether a matched flow table entry exists in a flow table of the forwarding module;

if so, the packet is forwarded according to the queried and matched flow table entry;

otherwise, the forwarding module sends the packet, a table number, and an upward transmission reason to a control module of the OF switch; the control module queries, according to the received table number and a flow table entry cache label stored by the control module, a flow table entry cached in a corresponding local flow table; if the corresponding flow table entry is acquired through the query, the flow table entry acquired through the query is added to the corresponding flow table of the forwarding module, otherwise, the packet, the table number and the upward transmission reason received by the control module are filled in a Packet-in message and sends the same to the OF controller.

Preferably, the method further includes that: idleness aging is performed, according to the second idleness aging period, on a flow table entry that can be cached according to an indication of a cache label in the forwarding module of the OF switch; the aged flow table entry is deleted; when the aged flow table entry is deleted, the flow table entry in the forwarding module reports statistic data to a corresponding flow table entry cached by the control module to accumulate related statistic data; idleness aging is performed, according to the first idleness aging period set when the OF controller sends a corresponding flow table entry, on a corresponding flow table entry cached by the control module, and the aged flow table entry is deleted, wherein the duration of the first idleness aging period is set according to that of the second idleness aging period. It is required that the duration of the first idleness aging period is longer than that of the second idleness aging period. Preferably, the duration of the first idleness aging period at least doubles that of the second idleness aging period.

Since the second idleness aging period is recommended by the OF switch to the OF controller, the OF controller sets the first idleness aging period according to the second idleness aging, and sets the duration of the first idleness aging period to be longer than that of the second idleness aging period, thus an idle flow table entry of a forwarding plane of the OF switch may be aged earlier, so as to save a table space of the forwarding module, while an idle flow table entry cached by the control module of the OF switch may be aged later, so that when traffic of the flow table entry is matched, the control module of the OF switch may be triggered in time to send the flow table entry to the forwarding module when a flow table entry of the forwarding module is not added or has been aged, thus it is unnecessary to always send a constructed Packet-in message to the OF controller to trigger transmission of a related flow table entry from the OF controller.

A method for sending a flow table in an SDN at an OF controller side according to an embodiment of the present disclosure mainly includes that: when deciding, according to a local strategy, to set a cache label for a sent flow table entry, an OF controller sends a flow table entry modification message to an OF switch, wherein the message includes a table number, a flow table entry, and a cache label and the cache label is used for instructing to cache the flow table entry in a control module of the OF switch locally.

Preferably, the flow table entry modification message further includes a first idleness aging period. The first idleness aging period is an aging period of a flow table in a control module, which is set by the OF controller for the OF switch.

As a preferred embodiment, before the OF controller sends the flow table entry modification message, the method further includes that: the OF controller negotiates a flow table cache capability with the OF switch, and the OF controller acquires whether the OF switch supports a cache function of a flow table, wherein that the OF controller negotiates that flow table cache capability with the OF switch includes that:

the OF controller sends a multipart table features request message to the OF switch, wherein the message includes the table number;

the OF controller receives a multipart table features reply message returned by the OF switch, wherein a flow table feature capability attribute field of the multipart table features reply message includes a flow table entry cache capability label for instructing whether a flow table entry cache function of a flow table corresponding to the table number is supported.

It needs to be noted that when the flow table entry cache capability label indicates that the flow table corresponding to the table number does not support the flow table entry cache function, the corresponding flow table entry sent from the OF controller does not include the cache label. When the flow table entry cache capability label indicates that the flow table corresponding to the table number supports the flow table entry cache function, the corresponding flow table entry sent from the OF controller includes the corresponding cache label. The cache label may be set according to a local strategy of the OF controller.

Preferably, the flow table feature capability attribute field further includes a default second idleness aging period of a flow table supporting a cache function. The second idleness aging period is an aging period of a flow table entry in a forwarding module of the OF switch.

As a preferred embodiment, the method further includes that:

when the OF controller receives a Packet-in message including a packet, a table number and an upward transmission reason from the OF switch, the OF controller parses the Packet-in message, and sends the packet in the Packet-in message to a local protocol stack or an APP of the OF controller for processing.

As a preferred embodiment, the method further includes that: the OF controller sets the first flow table modification table of the corresponding flow table entry when sending the flow table entry to the OF switch.

Figure 6:
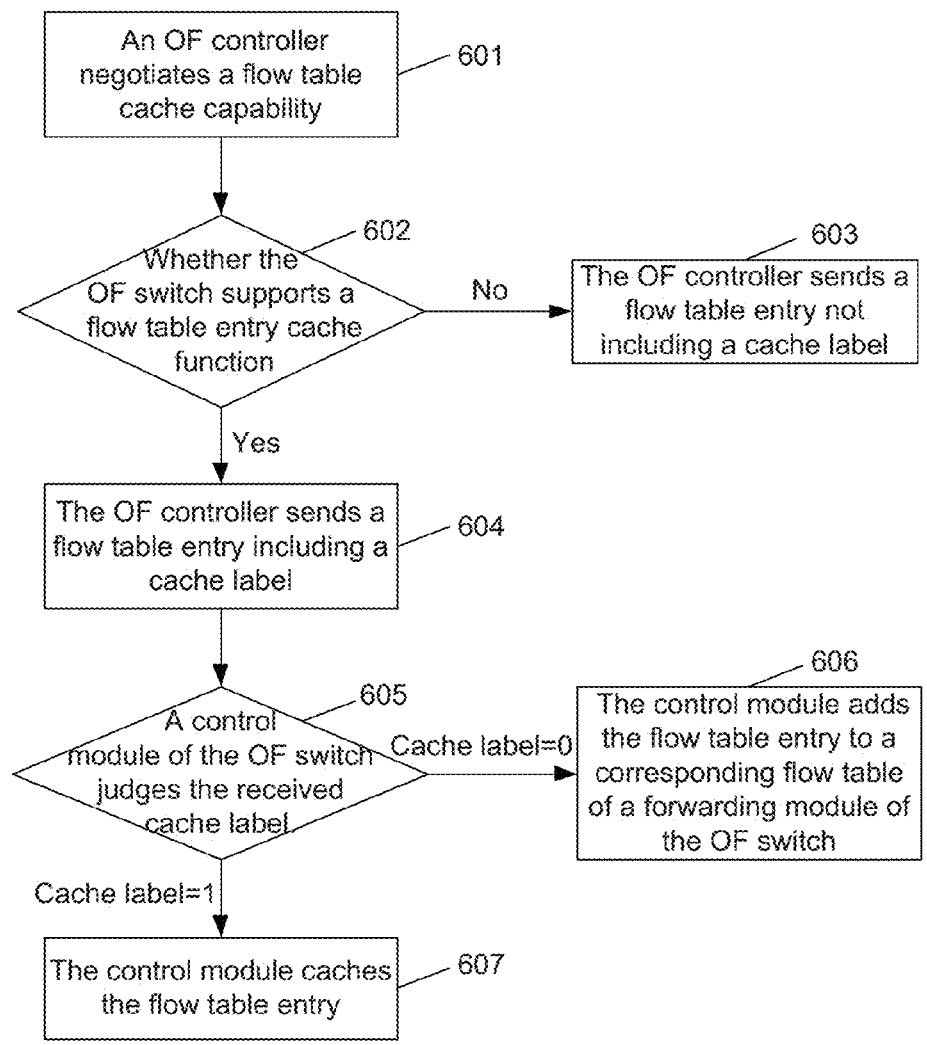
FIG. 6 is a flowchart of another method for sending a flow table in an SDN according to an embodiment of the present disclosure.

A method for sending a flow table in an SDN according to an embodiment of the present disclosure will be further elaborated in details below with reference to FIG. 6. Referring to FIG. 6, the method includes the following steps.

Step 601: An OF controller negotiates a flow table cache capability with an OF switch.

A specific negotiation process is as described in the embodiments above, and will not be described repeatedly here.

Step 602: According to the negotiation, the OF controller acquires whether a corresponding flow table supports a flow table entry cache function. If so, step 604 is performed, otherwise, step 603 is performed.

Step 603: The OF controller sends a corresponding flow table entry not including a cache label.

Step 604: The OF controller sends a corresponding flow table entry including a corresponding cache label.

For example, the OF controller negotiates the flow table cache capability with the OF switch to acquire that a certain flow table of the OF switch supports the flow table cache function, and the OF controller exchanges network routing information through a routing protocol, such as OSPF, and Intermediate System to Intermediate System Routing Protocol (IS-IS) and generates a routing entry dynamically, as shown in the following Table 1.

TABLE 1

| | Target address | Mask | Gateway | Interface | Owner | Priority | Metric |
|---|---|---|---|---|---|---|---|
| 1 | 10.26.32.0 | 255.255.255.0 | 10.26.245.5 | fei_1/1 | bgp | 200 | 0 |
| 2 | 10.26.33.253 | 255.255.255.255 | 10.26.245.5 | fei_1/1 | ospf | 110 | 14 |
| 3 | 10.26.33.254 | 255.255.255.255 | 10.26.245.5 | fei_1/1 | ospf | 110 | 13 |

The OF controller maps the routing entry into a flow table entry, as shown in the following Table 2.

TABLE 2

| | Match fields | | Counter | Instructions |
|---|---|---|---|---|
| | Target address | Mask | | |
| 1 | 10.26.32.0 | 255.255.255.0 | | Write-Metadata 10.26.245.5, port-no (fei_1/1); Write-Actions output port-no (fei_1/1); Goto Table 2 (e.g., ARP flow table) |
| 2 | 10.26.33.253 | 255.255.255.255 | | Write-Metadata 10.26.245.5, port-no (fei_1/1); Write-Actions output port-no (fei_1/1); Goto Table 2 (e.g., ARP flow table) |
| 3 | 10.26.33.25 | 255.255.255.255 | | Write-Metadata 10.26.245.5, port-no (fei_1/1); Write-Actions output port-no (fei_1/1); Goto Table 2 (e.g., ARP flow table) |

The new flow table entry is sent to the OF switch via a flow table entry modification message including a table number and a cache label of the flow table entry.

Specifically, an example of sending the flow table entry modification message to the OF switch by the OF controller is as follows.

```
struct ofp_flow_mod {
  ......
  /*Flow actions. */
  uint8_t table_id;/* flow table number (a routing flow table ID in
  the example) */
  uint8_t command;*/addition, modification or deletion of flow table
  entry (addition in the example) */
    uint16_t idle_timeout;/* Idle time before discarding (seconds). */
    uint 16_t hard_timeout;/* Max time before discarding (seconds). */
    uint16_t flags;/* including cache label of flow table entry*/
    struct ofp_match match; /* match fields (assumed to be the target
  address and the mask of the first entry in Table 2).*/
  //struct ofp_instruction_header instructions [0]; /* instructions
  (assumed to be the instructions of the first entry in Table 2).*/
  ......
  }.
```

Step 605: A control module of the OF switch judges the received cache label. step 606 is performed if the cache label is 0, and step 607 is performed if the cache label is 1.

After the OF switch receives the flow table entry modification message, the OF switch feeds back an error message to the OF controller if a flow table corresponding to the table number does not support the flow table entry cache function, and the OF switch judges the cache label if the flow table corresponding to the table number supports the flow table entry cache function. If the label is 0, it is indicated that the corresponding flow table entry is added to the corresponding flow table of a forwarding module of the OF switch, and if the label is 1, it is indicated that the flow table entry is locally cached in the control module, wherein it is also considered that it is indicated that the flow table entry modification message does not include the cache label if the label is 0.

Step 606: The control module adds the flow table entry to the flow table of the forwarding module of the OF switch.

Step 607: The control module stores the table number and the flow table entry. That is, after receiving the flow table entry from the OF controller, the control module locally caches the flow table entry first without immediately updating a flow table entry of the corresponding flow table.

Figure 7:
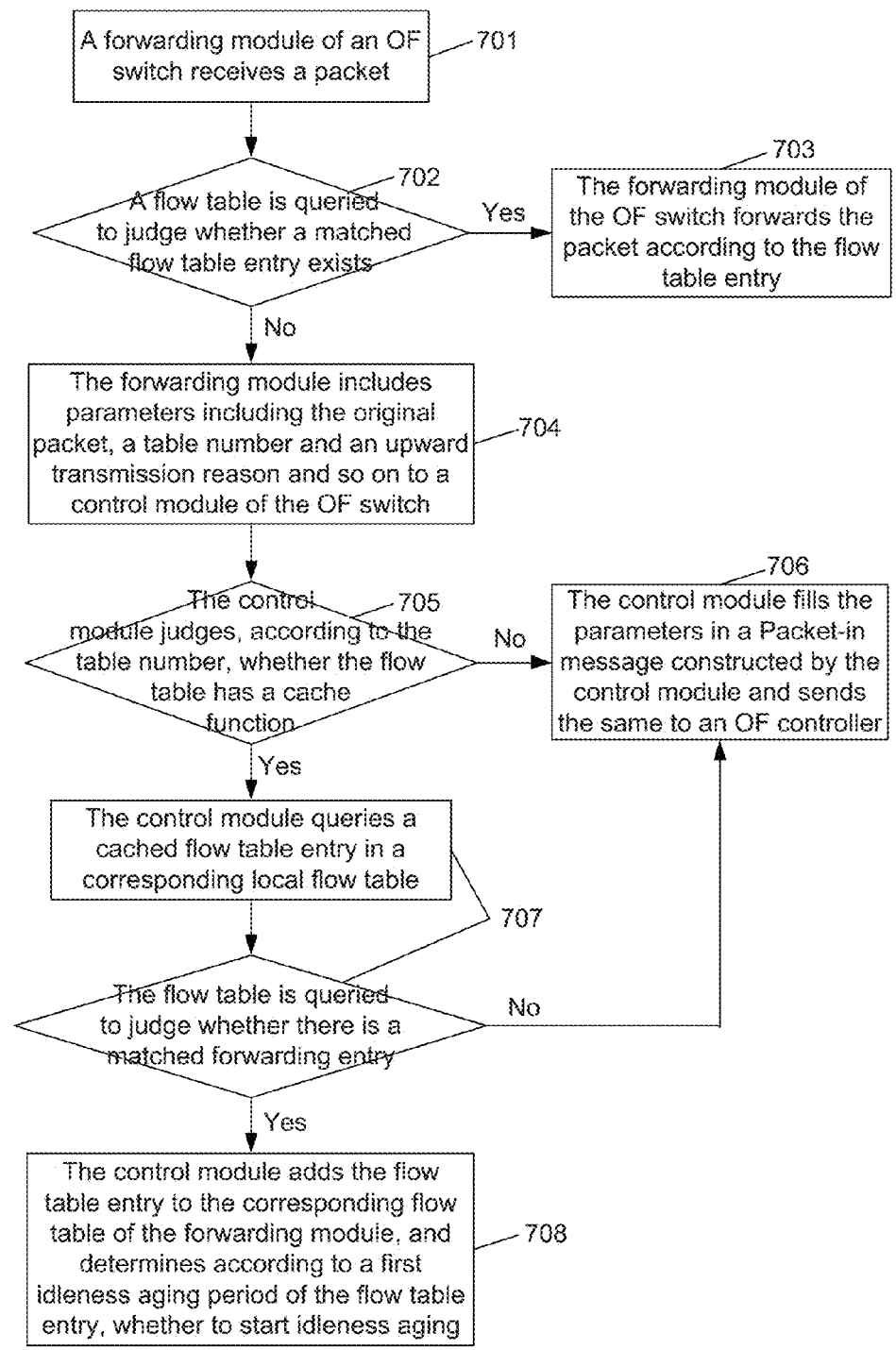
FIG. 7 is a flowchart of processing after an OF switch receives a packet according to an embodiment of the present disclosure.

A flow of processing after an OF switch receives a packet according to an embodiment of the present disclosure will be further expounded below with reference to FIG. 7. Referring to FIG. 7, the flow includes the following steps.

Step 701: A forwarding module of an OF switch receives a packet.

Step 702: Whether a matched flow table entry exists in a flow table of the forwarding module is queried. If yes, step 703 is performed, otherwise, step 704 is performed.

Step 703: The forwarding module of the OF switch forwards the packet according to the queried and matched flow table entry.

Step 704: The forwarding module sends parameters including the packet, a table number and an upward transmission reason and so on to a control module of the OF switch.

Step 705: The control module judges, according to the received table number, whether the corresponding flow table has a cache function. If yes, step 707 is performed, otherwise, step 706 is performed.

Step 706: The control module fills the received parameters in a Packet-in message and sends the same to an OF controller. The OF controller sends the packet in the Packet-in message to a local protocol stack or an APP of the OF controller for processing.

Step 707: The control module queries, according to the received table number and a flow table entry cache label stored by the control module, a cached flow table entry in a corresponding local flow table. If the corresponding flow table entry is acquired through the query, step 708 is performed, otherwise, step 706 is performed.

Step 708: The control module adds the flow table entry acquired through the query to the corresponding flow table of the forwarding module, and determines according to a second idleness aging period corresponding to the flow table, whether to start idleness aging on the corresponding flow table in the forwarding module.

In an embodiment of the present disclosure, when sending a flow table entry to an OF switch, an OF controller does not set a cache label for the sent flow table entry if the OF switch does not support a cache function for the corresponding flow table entry, and the OF switch adds such a flow table entry to a flow table of a forwarding module of the OF switch. When sending the flow table entry to the OF switch, the OF controller sets a cache label for the sent flow table entry if the OF switch supports the cache function for the corresponding flow table entry, and the OF switch caches such a flow table entry locally in the control module. When receiving a packet, the OF switch forwards the packet directly if a matched flow table entry existing in the flow table of the forwarding module is acquired through query, and if the matched flow table entry is not acquired through the query, query of a corresponding flow table entry in a cache routing flow table of a control plane is triggered, and the corresponding flow table entry is directly sent to a routing flow table of a forwarding plane after being found. Otherwise, a Packet-in packet is constructed and transmitted upwards to the controller for processing. In the embodiment of the present disclosure, the OF controller can send a routing flow table entry as required, and enable the OF switch to use idleness aging of a relatively short period of time, thus a routing information set on the controller can be reduced and mapped on the OF switch effectively within a limited period of time, the pressure on a routing flow table entry capacity index of the OF switch is relieved and a routing flow table entry capacity exceeding the index of the OF switch is implemented. In addition, both the control module and the forwarding module of the OF switch cache or store a flow table entry, and a flow table entry not matched by the forwarding module is preferentially matched from the control module, and reported to the controller for processing when the flow table entry is not matched, thereby not only reducing interaction between the controller and the switch and saving bandwidths, but also reducing a sending time delay of the flow table entry.

Figure 8:
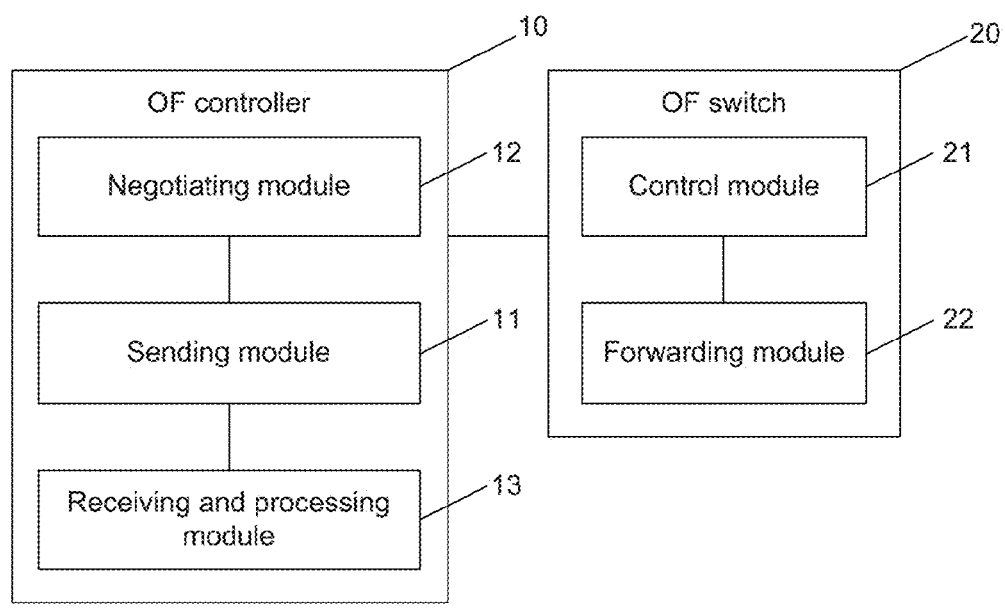
FIG. 8 is a structural diagram of a system for sending a flow table in an SDN according to an embodiment of the present disclosure.

Corresponding to the method for sending the flow table in the SDN, an embodiment of the present disclosure further provides a system for sending a flow table in an SDN, as shown in FIG. 8, including: an OF controller 10 and an OF switch 20, wherein the OF controller 10 is configured to, when deciding, according to a local strategy, to set a cache label for a sent flow table entry, send a flow table entry modification message to the OF switch 20, wherein the message includes a table number, the flow table entry, and a cache label;

the OF switch 20 is configured to receive the flow table entry modification message, and store in a control module of the OF switch locally according to an indication of the cache label, the table number and the flow table entry in the flow table entry modification message, wherein the OF controller 10 includes: a sending module 11 configured to, when deciding, according to the local strategy, to set the cache label for the sent flow table entry, send the flow table entry modification message to the OF switch 20, wherein the message includes the table number, the flow table entry, and the cache label and the cache label is used for instructing to cache the flow table entry in a control module of the OF switch 20 locally.

Preferably, the flow table entry modification message further includes a first idleness aging period.

The OF controller 10 further includes a negotiating module 12 configured to, before the sending module 11 sends the flow table entry modification message, negotiate a flow table cache capability with the OF switch 20. The negotiating module 12 acquires whether the OF switch 20 supports a cache function of a flow table.

Preferably, the negotiating module 12 is configured to send a multipart table features request message to the OF switch 20, wherein the message includes the table number; receive a multipart table features reply message returned by the OF switch 20, wherein a flow table feature capability attribute field of the multipart table features reply message includes a flow table entry cache capability label for instructing whether a flow table entry cache function of a flow table corresponding to the table number is supported.

Preferably, the flow table feature capability attribute field further includes a default second idleness aging period of a flow table supporting a cache function.

Preferably, the OF controller 10 further includes: a receiving and processing module 13 configured to, when receiving a Packet-in message including a packet, a table number and an upward transmission reason from the OF switch 20, parse the Packet-in message, and send the packet in the Packet-in message to a local protocol stack or an APP of the control module 10 for processing, wherein the OF switch 20 includes the control module 21, configured to receive the flow table entry modification message sent from the OF controller 10, wherein the message includes the table number, the flow table entry and the cache label; and store, in the control module 21 locally according to the indication of the cache label, the table number and the flow table entry in the flow table entry modification message.

Preferably, the flow table entry modification message further includes the first idleness aging period.

Preferably, the control module 21 is configured to negotiate the flow table cache capability with the OF controller 10 before receiving the flow table entry modification message and notify the OF controller 10 of whether the OF switch 20 supports a flow table cache function.

Preferably, the control module 21 is configured to receive the multipart table features request message sent from the OF controller 10, wherein the message includes the table number; and return the multipart table features reply message to the OF controller 10, wherein the flow table feature capability attribute field of the multipart table features reply message includes the flow table entry cache capability label for indicating whether the flow table entry cache function of the flow table corresponding to the table number is supported.

Preferably, the flow table feature capability attribute field further includes a default second idleness aging period of the flow table supporting the cache function.

Preferably, the OF switch 20 further includes a forwarding module 22 configured to query, when receiving a packet, whether a matched flow table entry exists in a flow table of the forwarding module 22;

if so, forward the packet according to the queried and matched flow table entry;

otherwise, the forwarding module 22 sends the packet, a table number, and an upward transmission reason to the control module 21 of the OF switch 20; accordingly, the control module 21 is configured to query, according to the received table number and a flow table entry cache label stored by the control module, a flow table entry cached in a corresponding local flow table; if the corresponding flow table entry is acquired through the query, add the flow table entry acquired through the query to the corresponding flow table of the forwarding module 22, otherwise, fill the packet, the table number and the upward transmission reason received by the control module 21 in a Packet-in message and send the same to the OF controller 10.

Preferably, the control module 21 is configured to perform, according to the second idleness aging period, idleness aging on a flow table entry that can be cached according to an indication of a cache label in the forwarding module 22 of the OF switch, and perform, according to the first idleness aging period set when the OF controller sends a corresponding flow table entry, idleness aging on a corresponding flow table entry cached by the control module 21, wherein the duration of the first idleness aging period is longer than that of the second idleness aging period.

An embodiment of the present disclosure further provides a computer readable storage medium. The storage medium includes a group of computer executable instructions for executing the method for sending the flow table in the SDN at the OF switch side.

An embodiment of the present disclosure further provides a computer readable storage medium. The storage medium includes a group of computer executable instructions for executing the method for sending the flow table in the SDN at the OF controller side.

Those skilled in the art should understand that the embodiments of the present disclosure may be provided as methods, systems, or computer program products. Thus the present disclosure may apply a form of a hardware embodiment, a software embodiment, or an embodiment combining software and hardware. In addition, the present disclosure may apply a form of a computer program product executed on one or more computer-usable storage medium (including, but not limited to a magnetic disk storage device and an optical disk storage device and so on) containing a computer-usable program code.

The present disclosure is described with reference to flowcharts and/or block diagrams of methods, devices (systems) and computer program products according to the embodiments of the present disclosure. It should be understood that each flow and/or block in the flowcharts and/or block diagrams, and combinations of flows and/or blocks in the flowcharts and/or block diagrams, can be implemented by computer program instructions. These computer program instructions may be provided to a processor of a general purpose computer, a special purpose computer, an embedded processor or other programmable data processing devices to produce a machine, such that the instructions executed via the processor of the computer or other programmable data processing devices, creates a device for implementing functions specified in one or more flows of the flowcharts or one or more blocks of the block diagrams.

These computer program instructions may also be stored in a computer-readable memory that can direct a computer or other programmable data processing devices to function in a particular manner, such that the instructions stored in the computer-readable memory produce an article of manufacture including an instruction device which implements the functions specified in one or more flows of the flowcharts or one or more blocks of the block diagrams.

These computer program instructions may also be loaded onto a computer or other programmable data processing devices to cause a series of operational steps to be performed on the computer or other programmable devices to produce a computer implemented process such that the instructions executed on the computer or other programmable devices provide steps for implementing the functions specified in one or more flows of the flowcharts or one or more blocks of the block diagrams.

What are described above are only preferred embodiments of the present disclosure, but are not used for limiting the protection scope of the present disclosure.

What is claimed is:

1. A method for sending a flow table in a Software Defined Network (SDN), comprising:
    negotiating, by an OpenFlow (OF) switch, a flow table cache capability with an OF controller, and notifying, by the OF switch, the OF controller of whether the OF switch supports a flow table cache function;
    receiving, by the OF switch, a flow table entry modification message sent from the OF controller, wherein the message includes a table number, a flow table entry and a first idleness aging period;
    when the OF switch supports the flow table cache function, the message also includes a cache label which is used for instructing to cache the flow table entry in a control processor of the OF switch locally; storing, by the OF switch, the table number and the flow table entry in the flow table entry modification message in the control processor of the OF switch according to an indication of the cache label; and
    performing, by the OF switch, idleness aging processing on a corresponding flow table entry cached in the control processor according to the first idleness aging period.

2. The method for sending the flow table in the SDN according to claim 1, wherein the step of negotiating, by the OF switch, the flow table cache capability with the OF controller comprises:
    receiving, by the OF switch, a multipart table features request message sent from the OF controller, wherein the message includes the table number;
    returning, by the OF switch, a multipart table features reply message to the OF controller, wherein a flow table feature capability attribute field of the multipart table features reply message includes a flow table entry cache capability label for indicating whether a flow table entry cache function of a flow table corresponding to the table number is supported.

3. The method for sending the flow table in the SDN according to claim 2, wherein the flow table feature capability attribute field further includes a default second idleness aging period of a flow table supporting a cache function.

4. The method for sending the flow table in the SDN according to claim 3, further comprising: performing, according to the second idleness aging period, idleness aging on a flow table entry that can be cached according to an indication of a cache label in the forwarding processor of the OF switch,
    wherein the duration of the first idleness aging period is longer than that of the second idleness aging period.

5. The method for sending the flow table in the SDN according to claim 1, further comprising: when the OF switch does not support the flow table cache function, the message includes no cache label; adding, by the OF switch, the table number and the flow table entry to a forwarding processor of the OF switch.

6. The method for sending the flow table in the SDN according to claim 1, further comprising:
    querying, by a forwarding processor of the OF switch when receiving a packet, whether a matched flow table entry exists in a flow table of the forwarding processor;
    if so, forwarding the packet according to the queried and matched flow table entry;
    otherwise, sending, by the forwarding processor, the packet, a table number, and an upward transmission reason to a control processor of the OF switch; querying, according to the received table number and a flow table entry cache label stored by the control processor, a flow table entry cached in a corresponding local flow table; when the corresponding flow table entry is acquired through the query, adding the flow table entry acquired through the query to the corresponding flow table of the forwarding processor, otherwise, filling the packet, the table number and the upward transmission reason received by the control processor in a Packet-in message and sending the same to the OF controller, by the control processor.

7. A method for sending a flow table in a Software Defined Network (SDN), comprising:
    negotiating, by an OpenFlow (OF) controller, a flow table cache capability with an OF switch, and acquiring, by the OF controller, whether the OF switch supports a cache function of a flow table;
    when the OF switch supports the flow table cache function, setting, by the OF controller, a cache label for a sent flow table entry according to a local strategy, and
    sending, by the OF controller, a flow table entry modification message to the OF switch; wherein the message includes a table number, a flow table entry, a first idleness aging period and a cache label;
    wherein the cache label is used for instructing to cache the flow table entry in a control processor of the OF switch locally; and the first idleness aging period, which is set by the OF controller for the OF switch, is an aging period of a flow table entry in a control processor.

8. The method for sending the flow table in the SDN according to claim 7, wherein the step of negotiating, by the OF switch, the flow table cache capability with the OF switch comprises:
    sending, by the OF controller, a multipart table features request message to the OF switch, wherein the message includes the table number;
    receiving, by the OF controller, a multipart table features reply message returned by the OF switch; wherein a flow table feature capability attribute field of the multipart table features reply message includes a flow table entry cache capability label for instructing whether a flow table entry cache function of a flow table corresponding to the table number is supported.

9. The method for sending the flow table in the SDN according to claim 8, wherein the flow table feature capability attribute field further includes a default second idleness aging period of a flow table supporting a cache function.

10. An OpenFlow (OF) switch, comprising a control processor, configured to:
negotiate a flow table cache capability with an OF controller and notify the OF controller of whether the OF switch supports a flow table cache function;
receive a flow table entry modification message sent from the OF controller, wherein the message includes a table number, a flow table entry and a first idleness aging period;
when the OF switch supports the flow table cache function, the message also includes a cache label which is used for instructing to cache the flow table entry in the control processor of the OF switch locally; store the table number and the flow table entry in the flow table entry modification message in the control processor of the OF switch locally according to an indication of the cache label; and
perform idleness aging processing on a corresponding flow table entry cached in the control processor according to the first idleness aging period.

11. The OF switch according to claim 10, wherein the control processor is configured to receive a multipart table features request message sent from the OF controller, wherein the message includes the table number; and return a multipart table features reply message to the OF controller, wherein a flow table feature capability attribute field of the multipart table features reply message includes a flow table entry cache capability label for indicating whether a flow table entry cache function of a flow table corresponding to the table number is supported.

12. The OF switch according to claim 11, wherein the flow table feature capability attribute field further includes a default second idleness aging period of a flow table supporting a cache function.

13. The OF switch according to claim 12, wherein the control processor is configured to perform, according to the second idleness aging period, idleness aging on a flow table entry that can be cached according to an indication of a cache label in the forwarding processor of the OF switch,
wherein the duration of the first idleness aging period is longer than that of the second idleness aging period.

14. An Openflow (OF) controller, comprising:
a negotiating processor configured to negotiate a flow table cache capability with an OF switch, and acquire whether the OF switch supports a cache function of a flow table;
a sending processor configured to:
when the OF switch supports the flow table cache function, set a cache label for a sent flow table entry according to a local strategy, and
send a flow table entry modification message to the OF switch, wherein the message includes a table number, a flow table entry, a first idleness aging period and a cache label;
wherein the cache label is used for instructing to cache the flow table entry in a control processor of the OF switch locally; and the first idleness aging period, which is set by the OF controller for the OF switch, is an aging period of a flow table entry in a control processor.

15. The OF controller according to claim 14, wherein the negotiating processor is configured to send a multipart table features request message to the OF switch, wherein the message includes the table number; receive a multipart table features reply message returned by the OF switch, wherein a flow table feature capability attribute field of the multipart table features reply message includes a flow table entry cache capability label for instructing whether a flow table entry cache function of a flow table corresponding to the table number is supported.

* * * * *